(12) United States Patent
Otani (10) Patent No.: US 6,418,557 B1
(45) Date of Patent: Jul. 9, 2002

(54) ON-DEMAND SYSTEM ENABLING CONTROL OF POWER-ON/OFF OF ON-DEMAND SERVER

(75) Inventor: Koji Otani, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/245,761

(22) Filed: Feb. 8, 1999

(30) Foreign Application Priority Data

Feb. 6, 1998 (JP) ............................................. 10-025917

(51) Int. Cl.[7] .......................... H04N 7/173; G06F 15/16
(52) U.S. Cl. ............................ 725/96; 725/93; 725/95; 709/208; 709/231
(58) Field of Search ........................... 725/87, 93, 91, 725/97, 114, 116, 95, 96; 709/208, 231

(56) References Cited

U.S. PATENT DOCUMENTS

| | | | | |
|---|---|---|---|---|
| 5,515,511 A | * | 5/1996 | Nguyen et al. | 395/200 |
| 5,935,206 A | * | 8/1999 | Dixon et al. | 709/291 |
| 6,065,123 A | * | 5/2000 | Chou et al. | 713/322 |
| 6,115,822 A | * | 9/2000 | Kim et al. | 713/310 |
| 6,327,622 B1 | * | 12/2001 | Jindal et al. | 709/228 |

* cited by examiner

Primary Examiner—John W. Miller
Assistant Examiner—Annan Q Shang
(74) Attorney, Agent, or Firm—Foley & Lardner (57) ABSTRACT

The on-demand system including a plurality of terminals, a plurality of on-demand servers and a center device having a request control unit, the center device further including a power control unit for controlling power-on and power-off of said on-demand server according to the number of said terminals in operation, said power control unit including a counter which counts up in response to an on signal transmitted from said terminal which has started operation and counts down in response to an off signal transmitted from said terminal which has stopped operation and a power control part having a threshold value according to the number of said terminals in operation and the necessary number of said on-demand servers and comparing said count value and said threshold value to supply power to said on-demand server to be newly operated and stop power supply to said on-demand server whose operation is to be stopped.

11 Claims, 3 Drawing Sheets

ON-DEMAND SYSTEM ENABLING CONTROL OF POWER-ON/OFF OF ON-DEMAND SERVER

BACKGROUND OF THE INVENTION

1. Field of the Invention

The present invention relates to an on-demand system having a plurality of terminals and one center device which has a plurality of on-demand servers and, more particularly, to an on-demand system characterized in a control system of power-on/off (power application/removal) of an on-demand server.

2. Description of the Related Art

Typical of an on-demand system having a plurality of terminals and one center device which has a plurality of on-demand servers is a video-on-demand (VOD) system. In the field of this system, each of a plurality of terminals is generally called a set top box (STB). While supplied with terminal source power, each STB is in an operative condition, where it is allowed to transmit a request signal for requesting for video-on-demand services to the center device.

Each of a plurality of video-on-demand servers (VOD servers) of a center device is in operation when supplied with server source power. The center device has a request control unit. Upon receiving a request signal from one of the plurality of STBs, this request control unit transmits a data delivery request signal of delivery data according to the request signal to one of the VOD servers in operation to cause the one VOD server to deliver delivery data to the STB which has transmitted the request signal.

One of on-demand systems is disclosed, for example, in Japanese Patent Laying-Open No. 7-327221. Japanese Patent Laying-Open No. 7-327221 recites a technique of sending out a halt signal or a halt release signal from an STB to a center send-out device which controls reproduction and stoppage of a VOD server to halt a program being reproduced or resume reproduction of the same and a technique of an STB having a halt time monitoring timer and a power-off monitoring circuit, which enable displaying of alarm indications on a screen of the STB when a halt time exceeds a predetermined time or when the power of the STB is to be turned off during halt.

In conventional on-demand systems such as a VOD system, it is a common practice that all the VOD servers are in operation at any time irrespective of the number of STBs in operation. In addition, power supply control of a VOD server is conducted manually.

It is therefore impossible to automatically control power-on/off (power application/removal) of a VOD server according to the number of STBs in operation, which causes a waste on operations management and operation costs.

SUMMARY OF THE INVENTION

First object of the present invention is to provide an on-demand system capable of automatically controlling power-on/off (application/removal) of on-demand servers according to the number of terminals in operation.

A second object of the present invention is to provide an on-demand system facilitating operations management of on-demand servers, as well as enabling reduction of operation costs, and also enabling improvement in reliability of on-demand servers with ease.

According to one aspect of the invention, an on-demand system including a plurality of terminals and one center device, the center device including a plurality of on-demand servers and a request control unit, the request control unit, in response to a request for on-demand services from the terminal, causing one of the on-demand servers in operation to deliver delivery data according to the request to the one of the plurality of terminals which has made the request, wherein the center device comprises a power control unit for controlling power-on/off of the on-demand servers according to the number of the terminals in operation, the power control unit comprises count means which counts up in response to an on signal transmitted from the terminal which has started operation and counts down in response to an off signal transmitted from the terminal which has stopped operation, and power control means having a threshold value corresponding to the number of the terminals in operation and the necessary number of the on-demand servers for comparing the count value and the threshold value to supply power to the on-demand server to be newly operated and stop power supply to the on-demand server whose operation is to be stopped.

In the preferred construction, each of the plurality of terminals includes signal transmission means for transmitting the on signal to the center device when supply of source power to the terminal is started and transmitting the off signal to the center device when supply of the source power is stopped.

In another preferred construction, when the count value reaches the threshold value, the power control means sends out a power supply signal for supplying source power to the on-demand server to be newly operated and when the count value falls below the threshold value, sends out a power supply stop signal for stopping supply of source power to the on-demand server whose operation is to be stopped.

In another preferred construction, the center device comprises a file device connected to the plurality of on-demand servers for storing accumulated data as file data, and upon reception of the data delivery request from the request control unit, one of the on-demand servers in operation finds the delivery data according to the request from among the file data stored in the file device and delivers the delivery data to the terminal which has made a request.

In another preferred construction, before the count value reaches the threshold value, the power control means sends out a notification signal which notifies the request control unit of the on-demand server in currently operation and when the count value reaches the threshold value to newly operate the on-demand server, sends out a notification signal which notifies the request control unit of all of the on-demand servers including the newly operated on-demand server.

In another preferred construction, when the count value falls below the threshold value to stop operation of the on-demand server, the power control means sends out, to the request control unit, an instruction signal for inhibiting transmission of the data delivery request to the on-demand server whose operation is stopped.

In another preferred construction, when the count value falls below the threshold value, the power control means sends out, to the request control unit, an instruction signal for inhibiting transmission of the data delivery request to the on-demand server whose operation is to be stopped, the request control unit, upon reception of a processing completion signal indicating that delivery of the delivery data in responses to all the requests is completed from the on-demand server whose operation is to be stopped, sends out, to the power control means, a power-off permission signal which permits stoppage of supply of source power to the on-demand server whose operation is to be stopped, and the power control means, upon reception of the power-off permission signal, sends out a power supply stop signal for stopping supply of source power to the on-demand server whose operation is to be stopped.

In another preferred construction, the power control means has, as the threshold value, a plurality of values based on an allowable capacity per one the on-demand server for the terminals and the necessary number of the on-demand servers for handling the number of the terminals currently in operation, first sets a threshold value meeting the number of the terminals in operation and the number of on-demand servers in operation corresponding to the terminals, when the count means counts up a count value, compares the threshold value set and the count value and when the count value reaches the threshold value, sends out a power supply signal for supplying source power to the on-demand server to be newly operated, as well as newly setting the threshold value, and when the count means counts down a count value, compares a threshold value obtained for the case where the number of necessary on-demand servers is reduced by one with the count value and when the count value falls below the threshold value, sends out a power supply stop signal for stopping supply of source power to the on-demand server whose operation is to be stopped, as well as setting the threshold value to be the threshold value obtained for the case where the necessary number of on-demand servers is reduced by one.

In another preferred construction, as the threshold value, a value is set which is obtained by multiplying a value obtained by subtracting a certain value from an allowable capacity per one the on-demand server for the terminals for leaving a margin by the number of on-demand servers necessary for handling the number of the terminals in operation.

In another preferred construction, the power control means has, as the threshold value, a plurality of values based on an allowable capacity per one the on-demand server for the terminals and the necessary number of the on-demand servers for handling the number of the terminals currently in operation, first sets a threshold value meeting the number of the terminals in operation and the number of on-demand servers in operation corresponding to the terminals, when the count means counts up a count value, compares the threshold value set and the count value and when the count value reaches the threshold value, sends out a power supply signal for supplying source power to the on-demand server to be newly operated, as well as newly setting the threshold value, and when the count means counts down a count value, compares a threshold value obtained for the case where the number of necessary on-demand servers is reduced by one with the count value and when the count value falls below the threshold value, sends out, to the request control unit, an instruction signal for inhibiting transmission of the data delivery request to the on-demand server whose operation is to be stopped, the request control unit, upon reception of a processing completion signal indicating that delivery of the delivery data in response to all the requests is completed from the on-demand server whose operation is to be stopped, sends out, to the power control means, a power-off permission signal which permits stoppage of supply of source power to the on-demand server whose operation is to be stopped, and the power control means, upon reception of the power-off permission signal, sends out a power supply stop signal for stopping supply of source power to the on-demand server whose operation is to be stopped, as well as setting the threshold value to be a threshold value obtained for the case where the necessary number of on-demand servers is reduced by one.

Also, as the threshold value, a value is set which is obtained by multiplying a value obtained by subtracting a certain value from an allowable capacity per one the on-demand server for the terminals for leaving a margin by the number of on-demand servers necessary for handling the number of the terminals in operation.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
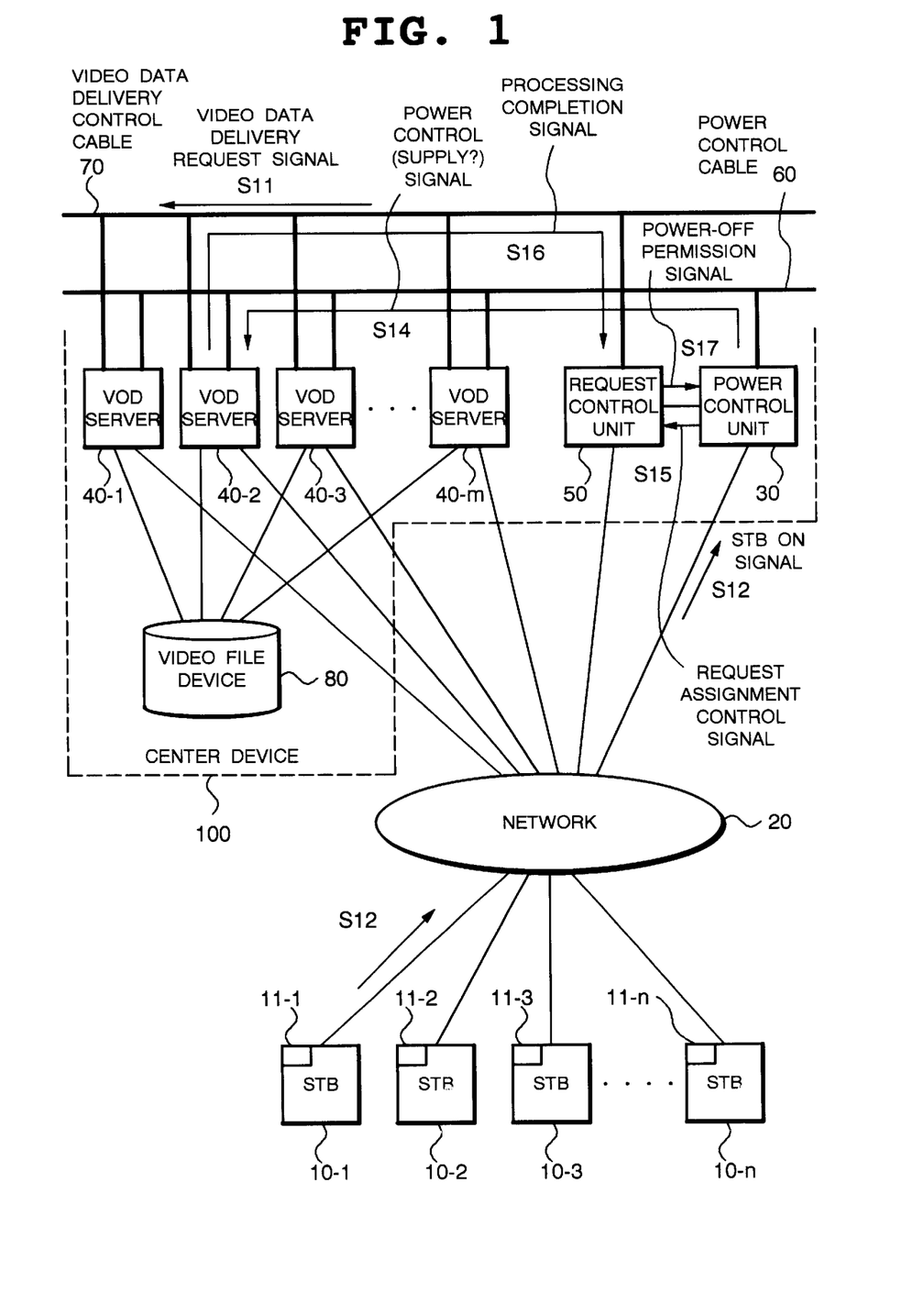
FIG. 1 is a block diagram showing a video-on-demand system according to one embodiment of the present invention.

FIG. 1 is a block diagram showing a vide-on-demand system according to one embodiment of the present invention.

In this invention, by calculating the number of terminals in operation and the number of on-demand servers in operation corresponding to the terminals in advance and making a power supply control unit recognize information (threshold value) about how many on-demand servers are to be in operation at each count value of terminals in operation, the power supply control unit is allowed to detect a terminal on signal and a terminal off signal and count the number of terminals in operation to automatically control power-on/off (power application/removal) of each on-demand server.

With reference to FIG. 1, a video-on-demand (VOD) system according to one embodiment of the present invention includes a plurality terminals (STB) 10-1, ..., 10-n and one center device 100. The STBs 10-1, ..., 10-n and the center device 100 are connected over a network 20.

The center device 100 includes first, second through m-th video-on-demand (VOD) servers 40-1, 40-2, ..., 40-m and a request control unit 50.

While supplied with terminal source power, each of the STBs 10-1, ..., 10-n is at the operative condition and in the operative condition, each STB is allowed to send a request signal for requesting for video-on-demand services to the center device 100. Each of the on-demand servers 40-1, 40-2, ..., 40-m is at the operative condition while supplied with server source power.

Upon receiving said request signal from one of the STBs 10-1, ..., 10-n, the request control unit 50 transmits a data delivery request signal S11 of delivery data according to said request signal to one of the VOD servers 40-1, 40-2, ..., 40-m in operation to cause said one of the VOD servers 40-1, 40-2, ..., 40-m to deliver said delivery data to said one of the STBs 10-1, ..., 10-n which has transmitted said request signal.

Each of the VOD servers 40-1, 40-2, ..., 40-m is typically connected to a video file device 80 which stores accumulated data as file data. In this case, upon receiving said data delivery request signal S11, said one of the VOD servers 40-1, 40-2, ..., 40-m in operation finds said delivery data according to said request signal from among the file data stored in the video file device 80 and delivers the found delivery data to said one of STBs 10-1, ..., 10-n which has transmitted said request signal.

Upon receiving the delivery data from the VOD servers 40-1, 40-2, ..., 40-m, the STBs 10-1, ..., 10-n decode the data and display the same on a display device.

The STBs 10-1, ..., 10-n each include signal transmission parts 11-1, ..., 11-n which transmit an STB on signal (terminal on signal) S12 indicative of the start of supply of terminal source power to the center device 100 when supply of terminal source power is started and an STB off signal (terminal off signal) S13 indicative of the stoppage of supply of terminal source power to the center device 100 when supply of terminal source power is stopped.

The center device 100 further includes a power control unit 30.

Figure 2:
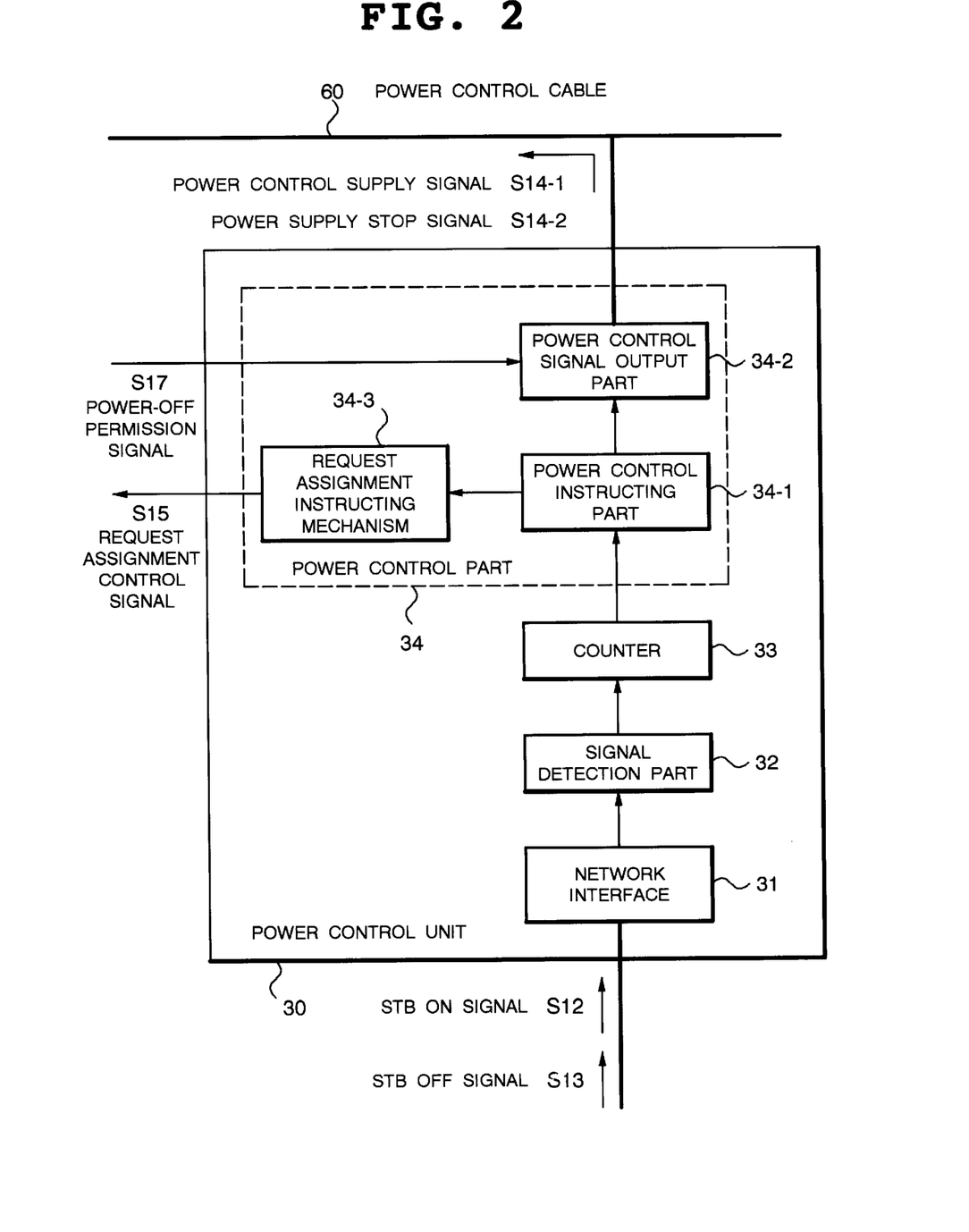
FIG. 2 is a block diagram showing a power supply control unit of the video-on-demand system illustrated in FIG. 1.

With reference to FIGS. 1 and 2, the power control unit 30 includes a network interface 31 connected to the network 20, a signal detection part 32 connected to the network interface 31 for detecting the STB on signal S12 and the STB off signal S13, a counter 33 connected to the signal detection part 32 and a power control part 34 connected to the counter 33. The counter 33 holds a count value of "0" as an initial value and counts up or counts down the count value in response to the STB on signals S12 and the STB off signals S13, respectively.

The power control part 34 has an integral threshold value S lager than "0" and smaller than the total number of STBs. As this threshold value S, a plurality of values are suitably set according to the number of STBs in operation and the number of necessary VOD servers.

One example of possible methods of setting a threshold value S is to set such that S=NQ holds, with Q as a value obtained by subtracting a certain value M from an allowable capacity P per one VOD server (capacity indicating how many STBs can be handled by one VOD server) in order to leave a margin, N as the number of VOD servers necessary for handling the number of STBs in currently operation and S as a threshold of the capacity of the VOD servers. In other words, a plurality of threshold value S are set according to the number of VOD servers necessary for handling STBs in operation.

In the case of the above-described setting method, when the allowable capacity P is set to be "50" and M is set to be 10, Q will be "40", whereby "40", "80", "120" ..., will be set as the threshold values S according to the value of N. Then, when the number of STBs in operation is 30, N will be 1, whereby "40" is selected as the threshold value S, while when the number of STBs in operation is 60, N will be 2, whereby "80" will be selected as the threshold value S.

The above-described method of setting a threshold S is an example only and other methods are also possible.

Before the count value of the above-described counter 33 reaches a threshold value S corresponding to the current number of STBs in operation and the current number of VOD servers in operation, the power control part 34 sends out a power supply signal S14-1 which makes a VOD server currently in operation be supplied with said server source power to the VOD server in operation. When said count value reaches the threshold value S, the part 34 sends out the power supply signal S14-1 to the VOD server in operation, as well as sending out the power supply signal S14-1 which makes a VOD server to be additionally operated be supplied with said server source power to said VOD server to be operated. The power control part 34 therefore includes a power control instructing part 34-1 and a power control signal output part 34-2 as will be described later.

In a case where only the first VOD server 40-1 is in operation, for example, before the count value reaches the threshold value S, the part 34 sends out, to the first VOD server 40-1, the power supply signal S14-1 which makes the first VOD server 40-1 be supplied with said server source power and when said count value reaches the threshold value S, the part 34 sends out the first power supply signal S14-1 to the first VOD server 40-1, as well as sending out the power supply signal S14-1 which makes the second VOD server 40-2 to be newly operated be supplied with said server source power to the second VOD server 40-2.

Before said count value reaches the threshold value S, the power control part 34 further sends out, to the request control unit 50, a notification signal which notifies the request control unit 50 that a VOD server currently operating is in the operative condition as a request assignment control signal S15 and when said count value reaches the threshold value S, sends out, to the request control unit 50, a notification signal which notifies the request control unit 50 that all the VOD servers including a VOD newly entering the operative state are in operation as the request assignment control signal S15. The power control part 34 therefore includes a request assignment instructing mechanism 34-3 which will be described later.

In a case where only the first VOD server 40-1 is in operation, for example, the power control part 34, before said count value reaches the threshold value S, sends out a notification signal which notifies the request control unit 50 that the currently operating VOD server 40-1 is in operative condition as the request assignment control signal S15 to the request control unit 50 and when said count value reaches the threshold value S, sends out a notification signal which notifies the request control unit 50 that the VOD server 40-1 and the newly operating VOD server 40-2 are in operation as the request assignment control signal S15 to the request control unit 50.

As long as said count value remains higher than or equal to the threshold value S after reaching the threshold value S, the power control part 34 sends out the power supply signal S14-1 to all the VOD servers in operation, as well as sending the request assignment control signal S15 as a notification signal to the request control unit 50.

In addition, after said count value reaches the threshold value S, when said count value falls below a threshold value S obtained for the case where the number N of necessary VOD servers is reduced by one, said power control part 34 sends out, to the request control unit 50, an instruction signal, as the request assignment control signal S15, which instructs the request control unit 50 to inhibit transmission of the data delivery request signal S11 to a VOD server whose power supply should be stopped (whose operation should be stopped) from that time point in question on.

The VOD server whose power supply should be stopped outputs a processing completion signal S16 to the request control unit 50 when delivery of delivery data in response to all the request signals is completed.

Upon receiving the processing completion signal S16, the request control unit 50 sends out, to the power control part 34, a power-off permission signal S17 which permits stoppage of supply of server source power to the VOD server whose power supply should be stopped.

Upon receiving the power-off permission signal S17, the power control part 34 sends out a power supply stop signal S14-2 for stopping supply of server source power to the VOD server whose power supply should be stopped in place of the power supply signal S14-1 to the VOD server in question. The power control part 34 therefore includes the power control signal output part 34-2 which will be described later.

In the following, thus structured VOD system will be more detailed.

In FIG. 1, the VOD system includes the plurality of STBs 10-1, ..., 10-n having the function of transmitting video reproduction function signals such as video data reproduction instructing signal and stop signal. The STBs 10-1, ..., 10-n include the signal transmission parts 11-1, ..., 11-n for transmitting the STB on signal S12 and the STB off signal S13, respectively.

The video file device 80 stores video data. The plurality of VOD servers 40-1, ..., 40-m share the video files in the video file device 80. The request control unit 50 decodes a signal sent from the STBs 10-1, ..., 10-n over the network 20 and conducts control and monitoring of video data delivery and inhibition of the plurality of VOD servers 40-1, ..., 40-m. A video data delivery control cable 70 delivers a control signal for delivery and inhibition of video data to the plurality of VOD servers 40-1, ..., 40-m from the request control unit 50.

The power control unit 30 controls power-on and power-off of the plurality of VOD servers 40-1, ..., 40-m so as to start the VOD servers 40-1, ..., 40-m corresponding to the number of STBs operating linking with the request control unit 50. A power control cable 60 transmits said first and second power supply signals S14-1 and the power supply stop signal S14-2 from the power control unit 30 to the plurality of VOD servers 40-1, ..., 40-m.

In FIG. 2, the power control unit 30 includes the network interface 31 and the signal detection part 32 for detecting the STB on signal S12 and the STB off signal S13 transmitted from the STBS 10-1, ..., 10-n.

The counter 33 counts up in response to the STB on signal S12 and counts down in response to the STB off signal S13.

The request assignment instructing mechanism 34-3 notifies the request control unit 50 of which VOD server has been turned on and transmits, to the unit 50, the request assignment control signal S15 which notifies that the unit 50 should not send a video data request signal to the VOD server 40 to which the power supply stop signal S14-2 has been transmitted.

The power control instructing part 34-1 calculates the number of VOD servers which meet the performance corresponding to the number of STBs in operation and compares the count value with a threshold value to instruct about which of the VOD servers 40-1, ..., 40-m should be turned on/off.

The power control signal output part 34-2 outputs the power supply signal S14-1 or the power supply stop signal S14-2 which gives an instruction on power-on or power-off to the VOD servers 40-1, ..., 40-m through the power control cable 60.

Power of the power control unit 30 is on at any time.

For turning off the power of the VOD servers 40-1, ..., 40-m in operation, the power control signal output part 34-2, after receiving the power-off permission signal S17 which notifies that preparation for turning off the power of a VOD server to be turned off is ready from the request control unit 50, outputs the power supply stop signal S14-2 to the VOD server whose power is to be turned off.

Figure 3:
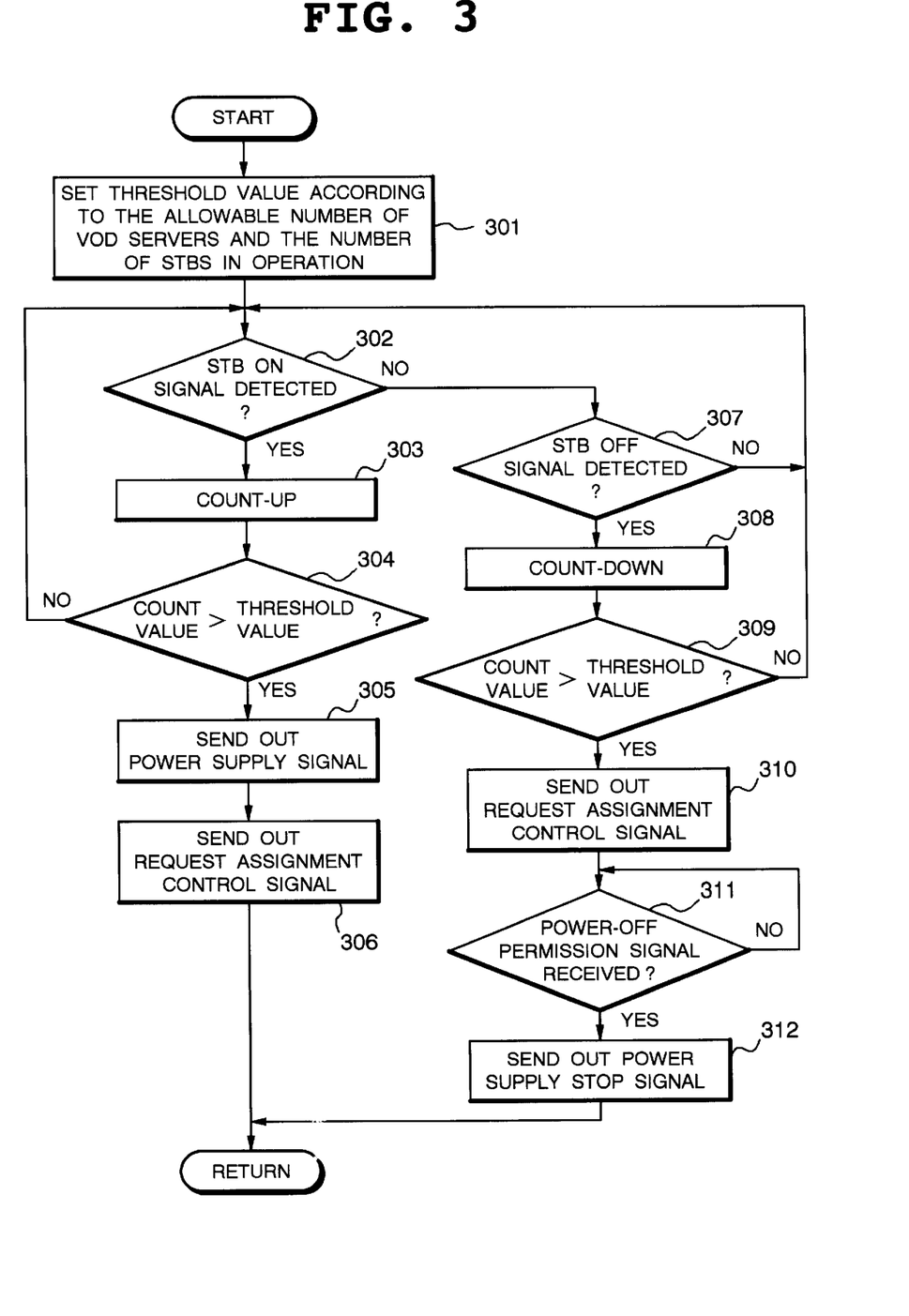
FIG. 3 is a flow chart for use in explaining control operation at the power supply control unit of the video-on-demand system according to the present invention.

Here, control operation of the power control unit 30 of the above-described VOD system will be described with reference to the flow chart of FIG. 3.

The power control unit 30 calculates the number of STBs in operation and the number of VOD servers in operation corresponding to the STBs to set, from among a plurality of threshold values S based on the above-described setting method, a threshold value S meeting the number of STBs in operation and the number of VOD servers in operation corresponding to the STBs (Step 301).

Next, upon detection of the STB on signal S12 from an STB at the signal detection part 32 (Step 302), the counter 33 counts up (Step 303) and determination is made whether the count value reaches a threshold value S or not (Step 304).

When the count value reaches the threshold value S, there arises the need of increasing the number of VOD servers to be operated, so that the power supply signal S14-1 is sent out from the power control part 34 to a VOD server to be newly operated (Step 305). Also, a notification signal which notifies that VOD servers in operation including the VOD server to which the power supply signal S14-1 has been sent are in the operative condition is sent as the request assignment control signal S15 to the request control unit 50 (Step 306).

When the count value reaches the threshold value S to operate another VOD server, a new threshold value is set at Step 301.

Upon detection of the STB off signal S13 from the STB at the signal detection part 32 (Step 307), the counter 33 counts down (Step 308) and the determination is made whether the count value falls below a threshold S obtained for the case where the number N of the necessary VOD servers is reduced by one (Step 309).

When the count value falls below the threshold value S obtained for the case where the number N of the necessary VOD servers is reduced by one, since it is necessary to reduce the number of VOD servers to be operated, an instruction signal which instructs the request control unit 50 to inhibit transmission of the data delivery request signal S11 to a VOD server whose power supply is to be stopped (operation to be stopped) is sent out as the request assignment control signal S15 to the request control unit 50 (Step 310).

When the VOD server whose power supply is to be stopped completes delivery of delivery data in response to all the request signals. and outputs the processing completion signal S16 to the request control unit 50, the power-off permission signal S17 which permits stoppage of supply of server source power to the VOD server whose power supply is to be stopped is sent out from the request control unit 50 which has received the processing completion signal S16 to the power control part 34.

The power control part 34 determines whether it has received the power-off permission signal S17 (Step 311) and upon reception of the power-off permission signal S17, sends out the power supply stop signal S14-2 for stopping supply of server source power to the VOD server whose power supply is to be stopped in place of the power supply signal S14-1 to the VOD server in question (Step 312).

When the count value falls below the threshold value S obtained for the case where the number N of necessary VOD servers is reduced by one to stop operation of the VOD server as described above, the threshold value compared with the above count value is set as a new threshold value at Step 301.

In the following, description will be made of a case where in FIG. 1, with an allowable capacity P per one of the VOD servers 40-1, . . . , 40-m handling up to 50 STBS, power control is conducted such that a power-on instruction will be given to a second VOD server at the time, for example, when the number of STBs 10-1, . . . , 10-n attains 40 for leaving a margin of the performance of the VOD servers 40-1, . . . , 40-m. In other words, the case where the threshold value S is set to be "S=NQ" as mentioned above and M is set to be 10.

In FIG. 1, it is assumed that only the VOD server 40-1 is operated and power of the VOD servers 40-2, . . . , 40-m are turned off. In this case, according to S=N (50–10), "40" is being set as the threshold value 40 from among the threshold values "40", "80", "120" . . . corresponding to the number N of the necessary VOD servers.

When power of the STB 10-1 is turned on to start the OS, the STB 10-1 transmits the STB on signal S12 which notifies that it enters the operation state to the power control unit 30 over the network 20. Assume that the power control unit 30 detects the STB on signal S12 and the counter 33 counts up to determine that the STB 10-1 is 40th to start. In this case, since the count value reaches "40" which is set as the threshold value S, the power control unit 30 transmits the power supply signal S14-1 to the second VOD server 40-2 to turn on the same.

In this case, since the number N of VOD servers in operation attains "2", "80" will be set as a new threshold value S. Then, this state continues until the number of STBs in operation (count value) attains "80".

Conversely, with the count value attaining 40 to set the threshold value S to be "80", when power of the STB 10-1 is turned off to bring the count value down to "39" by count-down, since the count value falls below "40" as the threshold value S obtained for the case where the number N of the necessary VOD servers is reduced by one, the power control unit 30 transmits, to the request control unit 50, the request assignment control signal S15 which notifies that the unit 50 should not send the video data delivery request signal S11 to the VOD server 40-2 whose power is to be turned off and upon reception of the processing completion signal S16 indicating that video data transmission processing is completed in response to all the requests from the VOD server 40-2 whose power is to be turned off, the request control unit 50 transmits the power-off permission signal S17 for permitting power-off of the VOD server 40-2 whose power is to be turned off to the power control unit 30. Upon confirming the reception of the power-off permission signal S17, the power control unit 30 outputs the power supply stop signal S14-2 to the VOD server 40-2 whose power is to be turned off.

Then, in this case, since the number N of the VOD servers in operation attains "1", "40" will be set as a new threshold value S.

In the above-described embodiment, controlling such that the number of VOD servers to be operated equals the necessary number N plus one leads to realization of a system with higher reliability. More specifically, it can be easily understood that a system with higher reliability can be realized by setting a threshold value S to be (N+1)Q.

Although the present embodiment has been described with respect to a VOD system as an example, it is apparent that the present invention is applicable also to a case where data to be delivered is not video data.

As described in the foregoing, according to the present invention, an on-demand system can be realized which enables automatic control of power-on/off (power application/removal) of an on-demand server according to the number of terminals in operation. As a result, it is possible to facilitate operations management of on-demand servers, as well as reducing operation costs, and to improve reliability of on-demand servers with ease.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. An on-demand system including a plurality of terminals and one center device, said center device including a plurality of on-demand servers and a request control unit, said request control unit, in response to a request for on-demand services from said terminal, causing one of said on-demand servers in operation to deliver delivery data according to said request to said one of the plurality of terminals which has made the request, wherein said center device comprises a power control unit for controlling power-on/off of said on-demand servers according to the number of said terminals in operation, said power control unit comprising:
count means which counts up in response to an on signal transmitted from said terminal which has started operation and counts down in response to an off signal transmitted from said terminal which has stopped operation; and
power control means having a threshold value corresponding to the number of said terminals in operation and the necessary number of said on-demand servers for comparing said count value and said threshold value to supply power to said on-demand server to be newly operated and stop power supply to said on-demand demand server whose operation is to be stopped.

2. The on-demand system as set forth in claim 1, wherein each of said plurality of terminals includes signal transmission means for transmitting said on signal to said center device when supply of source power to said terminal is started and transmitting said off signal to said center device when supply of said source power is stopped.

3. The on-demand system as set forth in claim 1, wherein when said count value reaches said threshold value, said power control means sends out a power supply signal for supplying source power to said on-demand server to be newly operated and when said count value falls below said threshold value, sends out a power supply stop signal for stopping supply of source power to said on-demand server whose operation is to be stopped.

4. The on-demand system as set forth in claim 1, wherein said center device comprises a file device connected to said plurality of on-demand servers for storing accumulated data as file data, and upon reception of said data delivery request from said request control unit, one of the on-demand servers in operation finds said delivery data according to said request from among the file data stored in said file device and delivers the delivery data to said terminal which has made a request.

5. The on-demand system as set forth in claim 1, wherein before said count value reaches said threshold value, said power control means sends out a notification signal which notifies said request control unit of said on-demand server in currently operation and when said count value reaches said threshold value to newly operate said on-demand server, sends out a notification signal which notifies said request control unit of all of said on-demand servers including said newly operated on-demand server.

6. The on-demand system as set forth in claim 1, wherein when said count value falls below said threshold value to stop operation of said on-demand server, said power control means sends out, to said request control unit, an instruction signal for inhibiting transmission of said data delivery request to said on-demand server whose operation is stopped.

7. The on-demand system as set forth in claim 1, wherein when said count value falls below said threshold value, said power control means sends out, to said request control unit, an instruction signal for inhibiting transmission of said data delivery request to said on-demand server whose operation is to be stopped, said request control unit, upon reception of a processing completion signal indicating that delivery of said delivery data in responses to all the requests is completed from said on-demand server whose operation is to be stopped, sends out, to said power control means, a power-off permission signal which permits stoppage of supply of source power to said on-demand server whose operation is to be stopped, and said power control means, upon reception of said power-off permission signal, sends out a power supply stop signal for stopping supply of source power to said on-demand server whose operation is to be stopped.

8. The on-demand system as set forth in claim 1, wherein said power control means has, as said threshold value, a plurality of values based on an allowable capacity per one said on-demand demand server for said terminals and the necessary number of said on-demand servers for handling the number of said terminals currently in operation, first sets a threshold value meeting the number of said terminals in operation and the number of on-demand demand servers in operation corresponding to said terminals, when said count means counts up a count value, compares said threshold value set and the count value and when said count value reaches said threshold value, sends out a power supply signal for supplying source power to said on-demand server to be newly operated, as well as newly setting said threshold value, and when said count means counts down a count value, compares a threshold value obtained for the case where the number of necessary on-demand servers is reduced by one with the count value and when said count value falls below said threshold value, sends out a power supply stop signal for stopping supply of source power to said on-demand server whose operation is to be stopped, as well as setting said threshold value to be the threshold value obtained for the case where the necessary number of on-demand servers is reduced by one.

9. The on-demand system as set forth in claim 8, wherein as said threshold value, a value is set which is obtained by multiplying a value obtained by subtracting a certain value from an allowable capacity per one said on-demand server for said terminals for leaving a margin by the number of on-demand servers necessary for handling the number of said terminals in operation.

10. The on-demand system as set forth in claim 1, wherein said power control means has, as said threshold value, a plurality of values based on an allowable capacity per one said on-demand demand server for said terminals and the necessary number of said on-demand servers for handling the number of said terminals currently in operation, first sets a threshold value meeting the number of said terminals in operation and the number of on-demand demand servers in operation corresponding to said terminals, when said count means counts up a count value, compares said threshold value set and the count value and when said count value reaches said threshold value, sends out a power supply signal for supplying source power to said on-demand server to be newly operated, as well as newly setting said threshold value, and when said count means counts down a count value, compares a threshold value obtained for the case where the number of necessary on-demand servers is reduced by one with the count value and when said count value falls below said threshold value, sends out, to said request control unit, an instruction signal for inhibiting transmission of said data delivery request to said on-demand demand server whose operation is to be stopped, said request control unit, upon reception of a processing completion signal indicating that delivery of said delivery data in response to all the requests is completed from said on-demand server whose operation is to be stopped, sends out, to said power control means, a power-off permission signal which permits stoppage of supply of source power to said on-demand server whose operation is to be stopped, and said power control means, upon reception of said power-off permission signal, sends out a power supply stop signal for stopping supply of source power to said on-demand server whose operation is to be stopped, as well as setting said threshold value to be a threshold value obtained for the case where the necessary number of on-demand servers is reduced by one.

11. The on-demand system as set forth in claim 10, wherein as said threshold value, a value is set which is obtained by multiplying a value obtained by subtracting a certain value from an allowable capacity per one said on-demand server for said terminals for leaving a margin by the number of on-demand servers necessary for handling the number of said terminals in operation.

* * * * *